Figure 6:
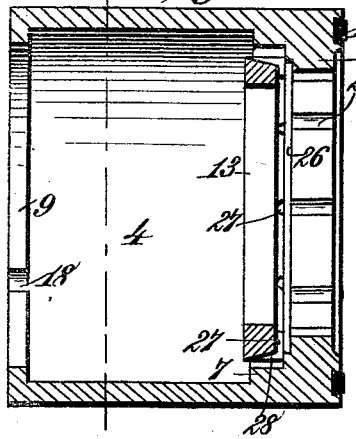

(No Model.) 2 Sheets—Sheet 1.
F. P. & J. T. MARTIN.
ROD PACKING.
No. 470,301. Patented Mar. 8, 1892.
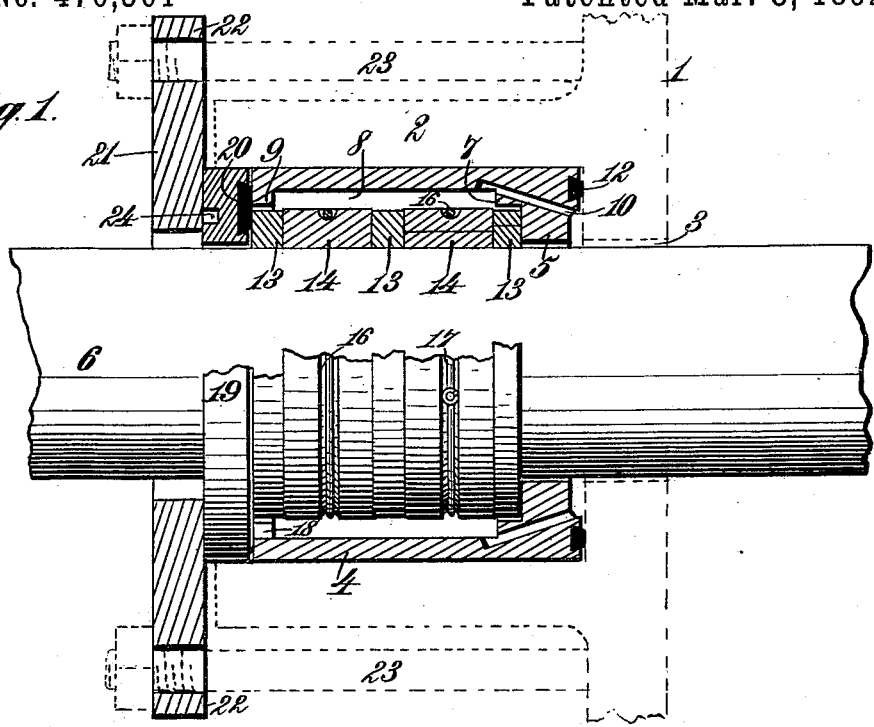
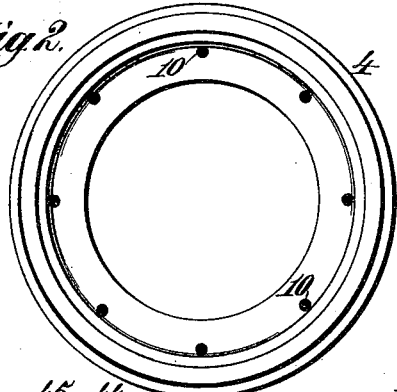
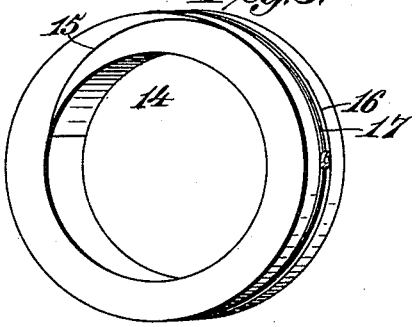
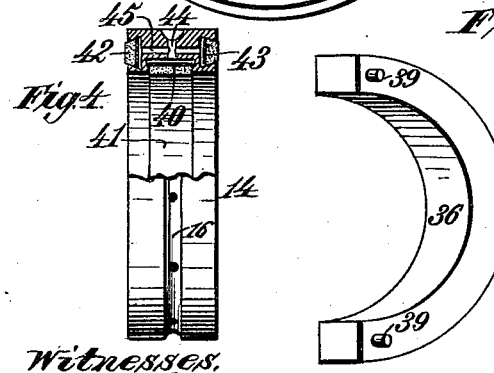
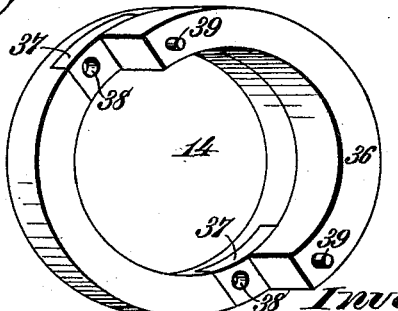
Witnesses.
Robert Everett
J. A. Rutherford
Inventors.
Francis P. Martin
John T. Martin
By James L. Norris
Atty.

(No Model.) 2 Sheets—Sheet 2.

F. P. & J. T. MARTIN.
ROD PACKING.

No. 470,301. Patented Mar. 8, 1892.

Witnesses.
Robt. Everett.
J. A. Rutherford

Inventors,
Francis P. Martin.
John T. Martin.
By James L. Norris.
Atty.

UNITED STATES PATENT OFFICE.

FRANCIS P. MARTIN, OF EASTON, AND JOHN T. MARTIN, OF SCRANTON, PENNSYLVANIA.

ROD-PACKING.

SPECIFICATION forming part of Letters Patent No. 470,301, dated March 8, 1892.

Application filed June 12, 1891. Serial No. 396,035. (No model.)

*To all whom it may concern:*

Be it known that we, FRANCIS P. MARTIN, residing at Easton, in the county of Northampton, and JOHN T. MARTIN, residing at Scranton, in the county of Lackawanna, State of Pennsylvania, both citizens of the United States, have invented new and useful Improvements in Rod-Packing, of which the following is a specification.

Our invention relates to rod-packing of the type shown, described, and claimed in Letters Patent of the United States granted to Francis P. Martin the 7th day of January, 1890, No. 418,802, and in the several applications for Letters Patent filed by the said Francis P. Martin and John T. Martin, jointly, upon the 11th day of March, 1890, Serial No. 343,543, upon the 28th day of June, 1890, Serial No. 357,134, and upon the 22d day of November, 1890, Serial No. 372,346, all of which stand allowed.

It is our purpose to provide an improved form of packing for piston and valve rods having a novel construction, whereby the live steam shall have access to the outer face of the packing without requiring the drilling of long openings and the expense caused by the frequent breakage of drills, which is unavoidable, as well as the time and skilled labor necessary, which is in itself no small item in the cost of manufacture.

It is our purpose, also, to provide a novel construction of metallic packing whereby a water-tight, as well as a steam-tight, joint or engagement shall be produced and whereby, also, the packing may be divided in the line of the diameter or in the axial plane of the rod without injury to the efficiency of the packing, thereby enabling the latter to be removed and replaced, or new packing substituted, without disconnecting the rod.

It is the further object of our invention to provide means for clamping the metallic packing down upon the rod when first applied thereto to insure continuous and uniform contact throughout, to provide a novel and simple construction and combination of parts, whereby a steam-joint may be formed around the rod-opening in the cylinder-head and over the aperture between the packing and its housing at the mouth of the stuffing-box without the expense and trouble of grinding two contacting-surfaces to a steam-face, and to provide a novel construction and assemblage of parts whereby a packing composed of a plurality of metallic parts may be built up to any required extent and its housing made coextensive therewith, the whole being adapted for insertion within the ordinary stuffing-box of a steam-cylinder, by which it is completely inclosed, and within which it is securely confined.

It is our purpose, finally, to simplify and improve metallic packings of this type, to cheapen the construction, to render the packing more efficient, to provide simple means for sealing the same within a stuffing-box, and to so construct the sealing-annulus that it may be readily and quickly removed from the stuffing-box to give access to the packing.

Our invention consists to these ends in the several novel features of construction and new combinations of parts hereinafter fully set forth, and then more particularly pointed out and defined in the claims.

To enable others skilled in the art to clearly understand and to make, construct, and use our said invention, we will now describe the same in detail, reference being had to the accompanying drawings, in which—

Figure 7:
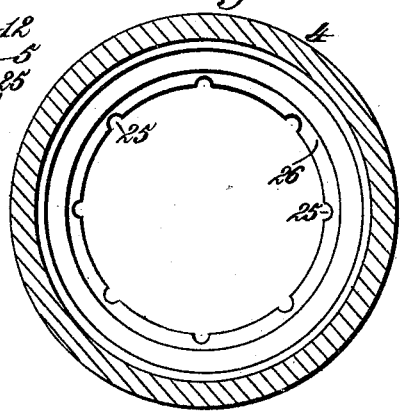
Figure 8:
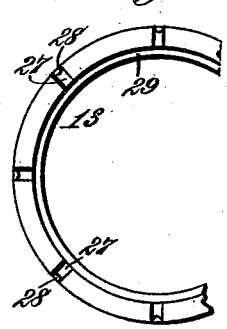
Figure 9:
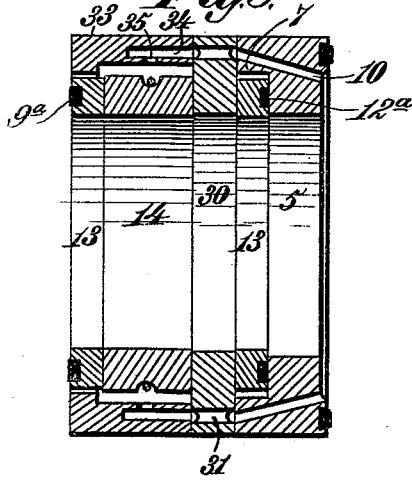
Figure 10:
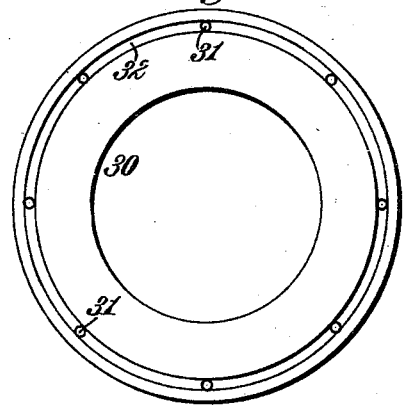
Figure 11:
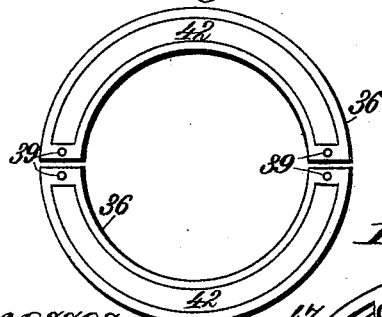
Figures 12, 13, 14:
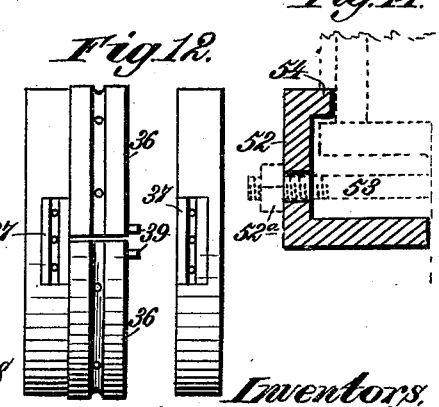

Figure 1 is a sectional elevation of a portion of a rod and part of a cylinder-head having a stuffing-box equipped with our invention. Fig. 2 is an elevation of the inner or seating end of the steam-housing removed from the stuffing-box. Fig. 3 is a perspective view of one of the cleft metallic packing-rings. Fig. 4 is a sectional elevation of a packing-ring, showing the combination, with a packing-ring, of auxiliary rod and ring packings. Fig. 5 is a perspective view showing a divided packing-ring and illustrating the manner of combining the same with a wear-plate or separating-ring, one half of the packing-ring being removed from the wear-plate and partly turned to show its reverse side. Fig. 6 is a central longitudinal section of one form of steam-housing, a port-ring being placed in its end, but the metallic packing being removed. Fig. 7 is an end elevation of the parts shown in Fig. 6. Fig. 8 is an elevation of the steam-face of the port-ring shown in Fig. 6 removed from the steam-housing. Fig. 9 is a central section in the plane of the axis of a steam-housing built up of a plurality of parts, the metallic packing being shown therein. Fig. 10 is an elevation of one face of the separating-ring shown in Fig. 9. Fig. 11 is a face elevation of a separable or divided packing-ring, showing the channels for the auxiliary packing. Fig. 12 is an elevation of the outer or steam face of the packing-ring shown in Fig. 11, with a wear-plate upon each side, one of the same being slightly separated from the packing-ring to show the connecting-dowels. Fig. 13 is an enlarged detail perspective of one of the connecting-blocks removed from its recess in the wear-plate. Fig. 14 is a partial section showing one form of device for holding the sealing-ring and locking the packing in place in the stuffing-box.

In the inventions referred to in the opening clause of this specification the steam-housing was held in the stuffing-box by a screw-cap, or was contained within a separable box, which was bolted upon the head of the cylinder, a gland being in some cases inserted within the stuffing-box to bear on the packing, bolts being passed through lugs on the gland into the cylinder-head. In these constructions it was necessary to grind the seating-faces of the port-ring and of that part of the cylinder-head on which it rests to a steam-fit, and it was also necessary to pack the rod at the mouth of the stuffing-box to prevent leaking of steam. In applying the packing to cylinders having old forms of stuffing-boxes the steam-housing would frequently project beyond the mouth of the box, or it was necessary to thread the exterior to receive the screw-cap; or where a gland was inserted a steam-joint had to be made between the end of the gland and the outer ring and between the cylindrical face and the mouth of the box. While the packing operated successfully, the expense and time required in fitting up an engine was a serious consideration. In carrying the live steam to the back of the metallic packing to compress the latter upon the rod it was also necessary in some cases to drill extended steam-passages in the steam-housing and to form passages intersecting the same, and this method was an unavoidable cause of the destruction of a considerable number of drills. The highest degree of skill and the utmost exercise of patience and caution could only reduce the number of breakages, and the class of labor required was of itself a large item in the expense account. Our present invention wholly obviates these objections.

In the accompanying drawings, the reference-numeral 1 in Fig. 1 designates a portion of the cylinder-head of a locomotive or other steam-engine having a stuffing-box 2, which may be of any ordinary construction. In the cylinder-head within the box is formed the rod-opening 3, through which the piston-rod plays.

4 indicates the steam-housing, which consists in the form shown in Fig. 1 of a cylindrical shell of cast metal of such exterior diameter as to fit loosely in the stuffing-box, its greatest length being somewhat less than the depth or interior length of the stuffing-box. At the inner end of this shell is a thick inwardly-turned collar 5, which closely approaches the surface of the piston-rod 6, but does not touch the same. In front of this collar is an offset 7, the face of which lies about half-way between the surface of the rod and the interior face of the stuffing-box. In front of this offset, which is of narrow width, the whole interior face of the shell is cut away to form an annular internal recess or steam-chamber 8, which extends to a narrow and shallow flange or inwardly-turned collar 9 upon the outer end of the housing. The outer flat face of this collar lies a little within the open mouth of the stuffing-box.

Live steam is admitted to the chamber 8 through a series of steam-passages 10, drilled through the flange 5 and passing just behind or back of the offset 7 and entering the inner end of the steam-chamber at the base of said offset. The steam-passages are drilled at an angle with the axis of the rod, being outwardly divergent, and are formed at such intervals as to give the necessary volume of steam.

The annular recess 8, formed in the inside of the inserted case or shell 4, not only constitutes a steam-chamber common to a series of cleft packing-rings, but it provides the requisite space for up-and-down movements of such rings, whereby the latter can be made greater in diameter than the separating or wear plates, which is a desirable construction.

By providing the annular recess 8 the packing-rings can move up and down, and consequently we prevent the piston-rod from riding on the rings, which would soon destroy them. The wear of the cross-heads, guides, cylinders, and piston-heads of an engine soon permits the piston-rod to move up and down; but in our construction this does not permit the piston-rod to ride on the cleft packing-rings, because the latter can move up and down in the annular recess 8 of the inserted case or shell 4. The inner end face of the flange 5 is cut away or countersunk from the inner margin of the flange to a point extending to or a little beyond the mouths of the steam-passages 10. In the annular face, lying radially outside of or beyond the steam-passages, is inserted a circular cushion 12, of soft metal, which is usually set in a dovetailed channel and allowed to project somewhat beyond the outer surface of the annulus that it may seat upon the cylinder-head around the rod-opening 3 and between the steam-passages 10 and the interior face of the stuffing-box and form, under pressure, a perfectly-sealed joint impervious to the steam flowing through the rod-opening.

Within the steam-housing 4 is inserted a wear-plate or ring 13, preferably of brass, having such interior diameter as to fit the rod closely, but moving easily thereon, its exterior diameter being such that it lies loosely within the offset 7 and against the outer face of the flange 5. It may be solid or cleft or lapped in the usual manner of metallic packing-rings, such as are shown in Fig. 3, and its thickness is equal to or a little greater than that of the circular face of the offset 5.

Outside the wear-plate or ring 13 is placed a packing-ring 14, composed, by preference, of a composition of Babbit metal—tin and lead—though we do not limit ourselves thereto nor to any special compound or alloy. The ring is cleft in the ordinary manner, as shown at 15, Fig. 3, and upon its outer face or back is formed a substantially central groove or channel 16 of suitable depth, extending entirely around the ring. When the latter is placed upon the rod and its ends lapped, a wire 17, usually of copper, is placed in said groove and its ends joined and twisted together, thereby drawing the ring closely down upon the rod and causing it to conform thereto in every part. The twisted ends of the wire are cut off so as to project but little, if at all, beyond the back of the ring. It may be mentioned at this point that in order to draw the ring out of the steam-housing 4 a notch 18 may be formed in the collar 9, if necessary.

The metallic wire encircling the cleft packing-ring and having its ends tied together is an important and desirable feature, which differs substantially from a mere packing arranged in the annular groove formed in the periphery of a packing-ring and also from springs which yieldingly press ring-sections on a piston-rod. The main object of the tied wire is to hold the cleft ring tightly clamped on the rod when the ring is first applied thereto, thereby accurately and perfectly closing the cleft ring on the rod at the beginning to avoid the possibility of the cleft ring being pinched, so that it will not close tightly round the rod. Sometimes the soft-metal ring expands in a minute or two after the steam strikes it, and the cast-iron casing does not fully expand for some time thereafter. It is during this time that the tied wire accomplishes its object, to wit: It prevents the cleft ring being pinched between the surfaces of the separating or wear plates until the case or housing fully expands and the ring works freely by the steam-pressure. By this means the cleft ring is properly and accurately set to the rod at the beginning, and it remains true thereafter.

The packing is built up in the steam-housing by a second wear-plate or ring 13, a second packing-ring 14, and a third wear-plate or ring outside the second packing-ring, both packing-rings being thus arranged between wearing-surfaces of a different metal. The packing may be built up further in the same way, if necessary; but, as shown in Fig. 1, the two rings 14 and wear-plates or rings 13 fill the steam-housing, the outer wear-plate projecting a little from the mouth of the housing, for a purpose about to be described. The packing-rings are preferably made of such thickness that their backs or exterior faces are about flush, or nearly so, with the wear-plates, thereby leaving an ample steam-space in the chamber 8.

In the mouth of the stuffing-box 2 we insert a sealing ring or annulus 19, which may be of cast-iron or other suitable metal having a rod-opening which will permit the necessary lateral play of the rod, and of such thickness that it projects somewhat from the stuffing-box. In the inner face of the sealing plate or ring is formed a dovetailed channel of suitable width, within which is inserted a cushion 20, of soft metal, so located that its middle portion will overlie the circular aperture between the back of the outer wear-plate and the margin of the collar 9. This soft-metal cushion, like the circular cushion 12, projects from the face in which it is set to enable it to yield to pressure without bringing the surface of the sealing-plate into contact with the steam-housing. Upon the rod is slipped a pressure-plate 21, having a rod-opening larger than the rod and provided with lugs 22, through which pass bolts 23, their threaded ends being screwed into the cylinder-head. The pressure exerted by these bolts drives the cushion 12 against the cylinder-face and the sealing-ring 19 against the end of the housing and outer wear-plate with sufficient force to project the soft metal into every inequality and effectually seal the points at which steam might otherwise escape. The steam-pressure in the chamber 8 compresses the rings 14 upon the rod, making a steam-tight joint the instant steam is thrown into the end of the cylinder through which the rod passes, but releases the rings as the steam is cut off by the valve, so that there is no sensible friction as the rod moves outward. After the rings become worn the wire 17 will probably become loose, but rarely is displaced, and if it should be it can cause no trouble. We drill a small aperture 24 in the outer face of the sealing-ring to permit the insertion of a tapered metallic rod, which may be wedged therein by a tap from a hammer, and which forms an extremely convenient aid in removing the sealing-ring after the packing has been in use for some time, when the accumulation of oil and dirt has caused the ring to stick in the stuffing-box. The aperture may, if preferred, be threaded, and a second aperture may also be formed diametrically opposite; but usually one will be sufficient.

Instead of drilling the steam-passages 10 in the end of the steam-housing, we prefer to cut grooves 25 in the inner face of the flange 5, as shown in Fig. 6, and to cut a shallow and narrow steam-channel 26 around the outer face of said flange upon the edge of the face containing the grooves 25, which are intersected at their inner ends by said steam-channel. With this construction we form in the wear-plate or ring 13, lying within the offset 7, a series of radial notches 27, cut in the face lying next the flange 5 and communicating each with a notch 28, formed in the back or outer surface of the wear-plate, and decreasing in depth from the inner face of the wear-plate to the outer face thereof. We also cut a steam-channel 29 upon the inner face of the wear-plate next to the rod, as shown in Fig. 8, said channel intersecting each of the radial notches 27. It should be noted, however, that when the steam-channel 26 is present we may use a wear-plate having the radial notches 27 and the notches 28, but without the steam-channel 29, and in like manner when the latter channel is present in the wear-plate the steam-channel 26 in the flange is not essential. This construction gives an ample flow of steam into the chamber 8 and wholly obviates the necessity of drilling even the comparatively short passages 10.

In building up the packing it is sometimes necessary to use a greater or less number of packing-rings to fill the stuffing-box, and in such a case we divide the steam-housing 4 in the same plane as the front wall of the offset 7, as shown in Fig. 9. The inner wear-plate is then of the same thickness as the offset, so its outer face will be flush with the section-face of this part of the housing. Preferably, however, we use a packing-ring at this point similar to the rings 14, but without the wire 17 and of less thickness. Against the wear-plate or packing-ring last mentioned, as the case may be, is placed a separating plate or ring 30, having an outer diameter equal or substantially so to that of the housing and an inner diameter about the same as that of the flange 5. Through this separating-plate are drilled openings 31, so arranged as to radial distance and intervals as to register with the steam-passages 10. An intersecting channel 32 is also cut upon each face of the separating-plate to provide steamways in case the parts are turned so that the openings 31 fail to register with the steam-passages 10. One face of the separating-plate is shown in Fig. 10.

In front of the separating-plate is placed a section of housing 33, corresponding in most respects with the forward or outer end of the housing 4, save that steamways 34, parallel with the rod, are drilled from its inner face to or a little past the center, said ways registering, when the parts are turned into proper position, with the steam-openings 31 in the separating-plate. Radial openings 35 are cut from the inner face of this part or section of the housing to intersect the steamways 34 and admit steam to the back of a packing-ring 14, which lies against the separating-plate. The flat faces of the separable parts are ground to form steam-joints. When no more than the parts described are used, the packing will be completed by an outer wear-plate 13, as in Fig. 1, and a sealing-ring and pressure-plate similar to the parts 19 and 21 in Fig. 1 will be employed.

We also propose to divide the rings in certain cases to enable a worn or broken packing to be removed and a new one substituted without disconnecting the rod. This construction is shown in Figs. 5, 11, 12, and 13, in which the reference-numeral 36 designated a packing-ring of suitable soft metal made in two substantially equal parts or sections, each of which may be, and usually is, a very little less than a complete semicircle, so that when placed upon the rod there will be a narrow space between its ends and the ends of the other part or section. The wear-plate or ring 13 is similar to those already described, save that recesses are cut in the flat face adjacent to the packing, in which are closely-fitted section-blocks 37, of soft metal, flush with the wear-plate on all their exterior faces. These section-blocks are arranged diametrically opposite each other, and are of such length as to extend a little distance beneath the adjacent ends of the divided packing, being so fitted in the wear-plates that they are capable of adjustment upon the diametrical line or toward and from each other. In the outer flat face of each section-block are formed openings 38, which receive short dowel-pins 39, projecting from the contacting-faces of the ends of the packing, the openings 38 being of such size as to permit a limited play of the dowel-pins therein. The wear-plate or ring upon the other side of the packing has a similar construction and the connection with the ends of the packing is made in the same manner, as shown in Fig. 12. As the ring-sections wear away, the pressure of the steam upon their backs forces them inward and also draws their ends somewhat more closely together, while the section-blocks 37 are drawn inward by the ring-sections and forced inward by the steam, making a close fit upon the rod and preventing escape of steam at the points where the packing is divided.

We also propose to combine with either the ordinary packing-ring or with the divided ring last described an auxiliary packing, which is constructed and arranged as follows: In the case of the continuous cleft ring we form in its inner face a continuous central channel of suitable width and of dovetailed form in cross-section, as shown in Fig. 4. In the bottom of this channel, which is its widest part, is placed a strip of flexible material 40, such as tin or other suitable material, and the channel is then packed with asbestus or a similar fibrous packing 41, for which, however, we may substitute any finely-divided, flexible, and compressible packing material or compound which is adapted to the purpose. In the opposite flat faces of the ring, forming an angle of ninety degrees with the interior face, are formed similar channels of somewhat less width containing similar packing material 42, backed by strips of flexible material or metal 43. Radial steam-apertures 44 are drilled through the center of the ring into the inner channel, opening behind the flexible strip 40, and intersecting these apertures are openings 45, parallel with the axis of the ring and opening into the side channels behind the flexible strips 43. When steam is thrown into the steam-housing, its pressure forces these auxiliary packings outward against the rod and against the contiguous wear-plates, compressing the packings as they are partly expelled from the channels, and forming a joint through which neither steam nor water can pass. When this feature is applied to the divided ring, as shown in Figs. 11, 12, and 13, the construction is the same, save in the following particulars: The several channels in the ring-sections terminate at a little distance from the ends of each ring-section, and similar channels 46 are formed in the interior faces of the section-blocks 37 and curved channels 47 in their opposite flat faces, terminating before reaching the ends of the block, as seen in Fig. 3, while in the ends of the section-block we form channels 48, parallel with the axis of the rod and cut entirely through the ends of said block. These channels are filled with flexible and compressible packing material backed by flexible strips of some suitable material, like thin sheet metal, and radial steam-openings 49 are cut through into the inner channel 46. Intersecting steam-openings 50 are cut from each side channel 47 into the radial openings, and at each end an opening 51 is drilled from the center of the channel 48 into the nearest radial opening 49. In both forms of the ring this auxiliary packing gives a joint which is impervious to water and which possesses the important advantage already described as residing in our packings, that the compression upon the rod is relieved the instant steam is cut off from that end of the cylinder through which the rod passes.

In place of the pressure-plate shown in Fig. 1 we may substitute L-clamps 52, similar to those shown in Fig. 14. These clamps are operated by nuts $52^a$, similar to those in Fig. 1, screwed upon the threaded ends of rods 53, rigidly attached to the cylinder-head and passing through the clamps. Upon each clamp is a lug 54, which rests upon the sealing-ring and which may enter the mouth of the stuffing-box. Variations in the length of the stuffing-box may cause the packing, when built up, to lie so far within the box that the sealing-ring will not project, as in Fig. 1, and will thus preclude the use of the pressure-plate shown in Fig. 1, or other considerations may render the use of these clamps preferable, as they are lighter and less cumbersome and less expensive. The ends of the longer arms of said clamps will rest upon the cylinder-head 1, as shown in Fig. 14.

We place a soft-metal cushion, in many cases, in the outer end of the housing 4, and omit the cushion 20 in the sealing-ring 19, and in this construction a cushion of soft metal is also placed in the outer face of the outer wear-plate. Even when cushions of this description are used it will probably be found desirable to force the surfaces in which the cushions are set against the surfaces upon which the cushions rest. In certain cases, also, we use a fibrous auxiliary packing $9^a$, set in a groove or channel in the wear-plate, as seen in Fig. 9. Upon upright engines or pumps the fibrous packing shown in Fig. 4, which is set in the packing-rings, would not accomplish the purpose of preventing the escape of water of condensation if the outer face of the outer wear-plate had a plain metal surface only. When steam is thrown in behind the packing upon upright or other engines, especially after the engine has been standing still for some time, more or less water is always present in the bottom of the cylinder, and if special provision is not made between the joints of the packing-rings and wear-plates, between the inner face of the inner wear-plate and the inner end of the steam-housing, and between the sealing-ring and the outer wear-plate water will be forced out through these joints and splash over the engine by running down the piston-rod. Upright engines and pumps for fluids require this kind of packing last above described; but on locomotives and horizontal engines we may dispense therewith.

Where the packing-rings are not provided with the auxiliary packings, we drill small openings therein for the passage of the oil, which is fed to the steam-chest and mingled with the steam, and thus we provide for a constant lubrication of the rod, the steam passing with the oil through the small openings in the packing-rings.

A fibrous packing $12^a$ is shown upon the inner face of the inner wear-plate in Fig. 9, which will be used in those cases where the stationary, upright, or pumping engine is employed, as mentioned above.

We have described the packing-rings 14 as being preferably of soft metal, and while we think this the better material we nevertheless reserve the right to employ any other suitable metal in place of soft metal.

What we claim is—

1. In a rod-packing, the combination, with a cylinder-head having a stuffing-box projecting therefrom and a steam-housing comprising a series of packing-rings encircling the rod, of a metallic shell inserted into the stuffing-box and having its inner extremity provided with an attached circular soft-metal cushion seated against the cylinder-head, said metallic shell being formed with an annular interior recess common to a series of the packing-rings and serving not only as a steam-space, but to permit lateral or vertical movements of the packing-rings, substantially as and for the purposes described.

2. In a rod-packing, a steam-housing consisting of a metallic shell having a thick inwardly-turned flange at its inner end and provided with an offset next the flange and a steam-chamber between the offset and a narrow inwardly-turned collar at its outer end, in combination with a circular cushion of soft metal set in and projecting from the end face outside of a countersunk portion thereof and between the inner face of the stuffing-box and the steam-openings in the flange, substantially as described.

3. In a rod-packing, a steam-housing composed of separable sections of a metallic shell, in combination with a separating-ring arranged between the contiguous faces and provided with steam-openings to carry the steam from one section to the next and with circular channels intersecting the mouths of said openings, the inner section of the housing having steamways communicating with one of said circular channels and being provided with a circular soft-metal cushion projecting from its inner end outside said steam-openings, substantially as described.

4. In a rod-packing, a steam-housing consisting of a metallic shell having a thick inwardly-turned flange at its inner end, provided with steam channels or grooves upon its interior circular face which surrounds the rod, in combination with a port-ring loosely surrounding the rod and lying against the flat outer face of the flange, said ring being provided upon its outer edge or back with notches or grooves and with a circular channel intersecting radial channels upon its inner face, said circular channel being cut upon the inner margin of the ring, substantially as described.

5. In a rod-packing, a steam-housing consisting of a metallic shell insertible in the stuffing-box of a steam-cylinder and provided with a circular soft-metal cushion surrounding the steam-openings which admit steam to the interior of the housing, in combination with a packing built up of soft-metal packing-rings, each lying between wear-plates or rings, a sealing-ring having a soft-metal cushion overlying the circular aperture between the last wear-plate and the end of the steam-housing, and means for forcing the sealing-ring and housing inward to seat the soft-metal cushions upon the cylinder-head and upon the end of the housing and the outer wear-plate, respectively, substantially as described.

6. In a rod-packing, the combination, with a soft-metal packing-ring having interior and lateral channels and provided with radial steam-passages and steamways intersecting the same, of auxiliary flexible packings inserted in said channels, flexible strips arranged behind said packings, wear-plates arranged upon both sides of the ring, and a steam-housing inclosing the same, substantially as described.

7. In a rod-packing, the combination, with a soft-metal packing-ring, of an auxiliary flexible packing inserted in a dovetailed channel in said ring, a flexible strip back of said auxiliary packing, and a steam-housing inclosing the ring, the steam entering passages in the same and exerting its pressure on the flexible strip, substantially as described.

8. In a rod-packing, the combination, with a steam-housing, of a wear-plate having soft-metal section-blocks radially adjustable in diametrically-opposite recesses in its opposite face, and a two-part or divided soft-metal packing-ring having dowel-pins projecting laterally near the ends of each ring-section and entering enlarged openings in the section-blocks, substantially as described.

9. In a rod-packing, the combination, with a steam-housing, of wear-plates having radially-adjustable section-blocks of soft metal arranged in diametrically-opposite recesses in their lateral faces and provided with interior and lateral channels terminating at a little distance from the ends of the blocks and provided with end channels parallel with the axis of the rod and cut entirely across said ends, flexible packings inserted in said channels, flexible strips behind said packings pressed by steam entering through radial steamways and passages intersecting therewith, two-part packing-rings of soft metal having channels in their interior and lateral faces and extending nearly to the ends of the ring-sections, flexible packings set in said channels, and flexible strips back of said packings pressed by steam entering radial steamways in the ring, and passages intersecting said steamways, substantially as described.

10. In a rod-packing, the combination, with a steam-housing having a chamber supplied with steam from the cylinder, of a series of packing-rings and wear-plates arranged in said housing, the inner face of the inner wear-plate having a fibrous packing set in a groove therein, and a similar fibrous material being set in the outer face of the outer wear-plate, substantially as described.

In testimony whereof we have hereunto set our hands and affixed our seals in presence of two subscribing witnesses.

FRANCIS P. MARTIN. [L. S.]
JOHN T. MARTIN. [L. S.]

Witnesses:
FRANK W. McGURK,
JNO. V. GARTNER.